United States Patent [19]

Friegang

[11] Patent Number: 5,013,196
[45] Date of Patent: May 7, 1991

[54] SCRIBING ACCESSORY FOR OFFSET ROUTER

[76] Inventor: William R. Friegang, 5025 Vanderbilt Dr., San Jose, Calif. 95130

[21] Appl. No.: 556,660

[22] Filed: Jul. 23, 1990

[51] Int. Cl.⁵ .................... B27C 5/10; B23C 1/20
[52] U.S. Cl. .................... 409/182; 144/134 D; 144/371
[58] Field of Search ........... 144/134 R, 134 D, 136 C, 144/371; 409/181, 182

[56] References Cited

U.S. PATENT DOCUMENTS

| | | | |
|---|---|---|---|
| 2,839,107 | 6/1958 | Emmons | 144/134 D |
| 3,494,394 | 2/1970 | Stock | 144/136 C |
| 4,777,991 | 10/1988 | Adame | 144/134 D |
| 4,960,352 | 10/1990 | Kishi | 144/134 D |

Primary Examiner—W. Donald Bray
Attorney, Agent, or Firm—Rosenblum, Parish & Bacigalupi

[57] ABSTRACT

A scribing accessory for an offset router including an elongated metal plate having a guide wheel journaled to one end thereof and a spacer block attached to the lower surface thereof. Screws are provided for attaching the metal plate and/or block directly to the router base and for affixing a base plate to the bottom surface of the block. Alternatively, the base plate could be formed integral with the spacer block.

10 Claims, 3 Drawing Sheets

SCRIBING ACCESSORY FOR OFFSET ROUTER

BACKGROUND OF THE INVENTION

1. Field of the Invention

The present invention relates generally to routing apparatus of the type normally used in cabinet making and the like and more particularly to an improved scribing accessory for attachment to an offset router.

2. Discussion of the Prior Art

Router devices have been used by cabinet makers for many years to trim laminates and otherwise prepare cabinet edges and counter tops, and such routers have taken numerous configurations. In addition, various accessories have been provided and utilized to adapt the router for special purpose applications. An early modification of the simple router was the provision of an offset drive such as that disclosed in the U.S. Pat. No. 3,454,061 issued to L. Cordone et al. This attachment allowed the router bit to be positioned more closely to a wall or other impediment.

A more recent disclosure of accessories specifically directed to apparatus for trimming laminates is included in the U.S. Pat. No. 4,827,996 issued to Cotton et al. These accessories provide interchangeable bases which allow the router to function as a trim router, laminate trimmer, offset trimmer and tilt base trimmer. Each accessory clamps onto the lower position of the motor housing so that the same motor can be used for many applications.

The most relevant disclosure vis a vis the present invention relates to that shown in FIG. 21 of Cotton et al., wherein a generally triangular-shaped base is depicted, having side edges used as a scribing guide. In use, the material to be scribed would be spaced from a wall, ceiling or other intersecting surface, and the edge of the base plate would be drawn along the wall or ceiling with the router bit scribing the facing material edge so that it conforms thereto. The spacer would then be removed and the prepared surface mated with the wall. The problem with such apparatus is that frictional contact with the wall will in many cases scratch or otherwise mar the wall surface, and over time may even cause substantial wearing of the base edge, resulting in uneven spacing of the router bit from the wall depending on the angle with which the router is held relative to the workpiece, as it is drawn across the guiding surface.

SUMMARY OF THE PRESENT INVENTION

It is therefore a primary objective of the present invention to provide an improved scribing accessory for an offset trimmer having a wall engaging mechanism enabling substantially frictionless contact with the guiding surface.

Another object of the present invention is to provide a scribing accessory of the type described which can be readily attached to a wide variety of commercially available offset routers.

Still another object of the present invention is to provide a router accessory of the type described having means for uniformly spacing the router bit from the guide surface independent of the angle at which the router apparatus is turned as it is moved from one location to another during the scribing operation.

Briefly, a preferred embodiment of the present invention includes an elongated metal plate having a guide wheel journaled to one end thereof and a spacer block attached to the lower surface thereof. Screws are provided for attaching the metal plate and/or block directly to the router base and for affixing a base plate to the bottom surface of the block. Alternatively, the base plate could be formed integral with the spacer block.

An important advantage of the present invention is that it provides a quickly attachable scribing accessory for a conventional offset router.

Another advantage of the present invention is that it provides a scribing accessory which makes substantially frictionless engagement with an engaged surface.

Yet another advantage of the present invention is that it provides an improved scribing accessory which is used in substantially the same way that prior art scribing means are used.

These and other objects and advantages of the present invention will no doubt become apparent to those of ordinary skill in the art after having read the following detailed description of the preferred embodiments illustrated in the several figures of the drawing.

IN THE DRAWING

DETAILED DESCRIPTION OF THE PREFERRED EMBODIMENTS

Figure 1:
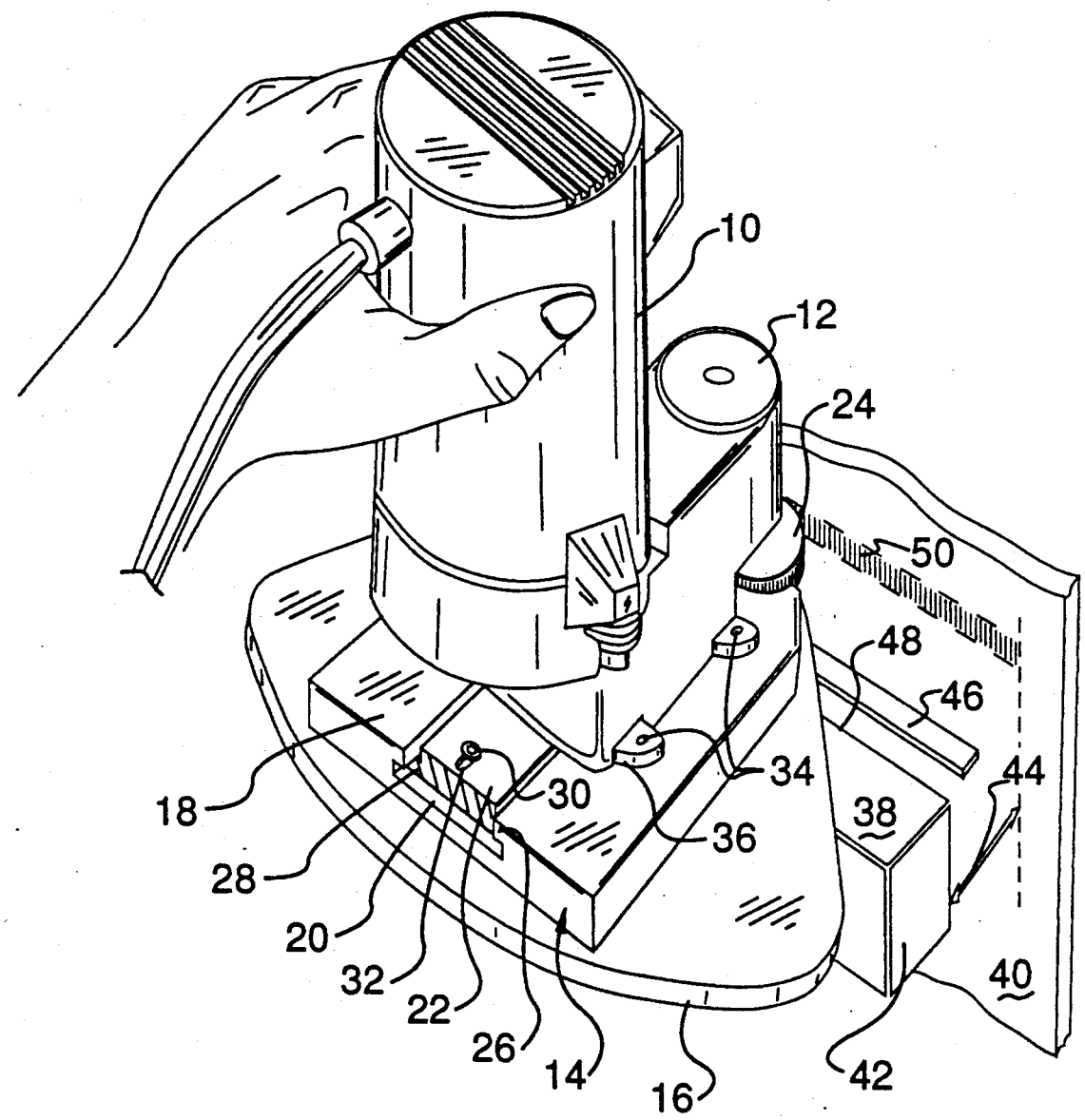
FIG. 1 is a perspective view illustrating a conventional offset router with a scribing accessory in accordance with the present invention attached thereto.

Referring now to FIG. 1 of the drawing, a conventional router device is shown at 10 having an offset mechanism 12 attached to the bottom thereof. Details of the router and offset mechanism may be found in U.S. Pat. No. 4,827,996 and such disclosure is expressly incorporated herein by reference. Attached to the bottom of the drive mechanism 12 is a scribing accessory 14 in accordance with a presently preferred embodiment of the present invention. Attached to the bottom of accessory 14 is a conventional base plate 16 of the general type disclosed in the above-referenced patent.

As will be more fully described below, accessory 14 includes a plastic spacer block 18 having a slot 20 formed therein for receiving an elongated metal plate 22 having a circular guide wheel 24 journaled to the distal end thereof. The sidewalls of slot 20 are undercut to form inwardly extending flanges 26 which capture laterally extending ribs 28 formed in the side edges of plate 22. Plate 22 is locked in place relative to block 14 by means of a locking screw 30 which is passed through a longitudinally extending slot 32 formed in plate 22.

Block 14 and base plate 16 are secured to the bottom of drive mechanism 12 by means of screws (not shown) which pass therethrough and are received within threaded apertures 34 provided in laterally extending feet 36.

In order to trim a piece of laminate 38 so that it matches an irregular surface of wall 40, one would merely space the underlying support 42 a predetermined distance from wall 40, as suggested by the arrow 44, and then, with plate 16 resting squarely on laminate 38, place the router assembly such that wheel 24 engages wall 40 and, while keeping wheel 24 in engagement with wall 40, move the router leftwardly to trim away the excess material 46, leaving an edge 48 that will identically match the surface of the wall over which wheel 24 has tracked as indicated by the imaginary "footprint" 50.

Figure 2:
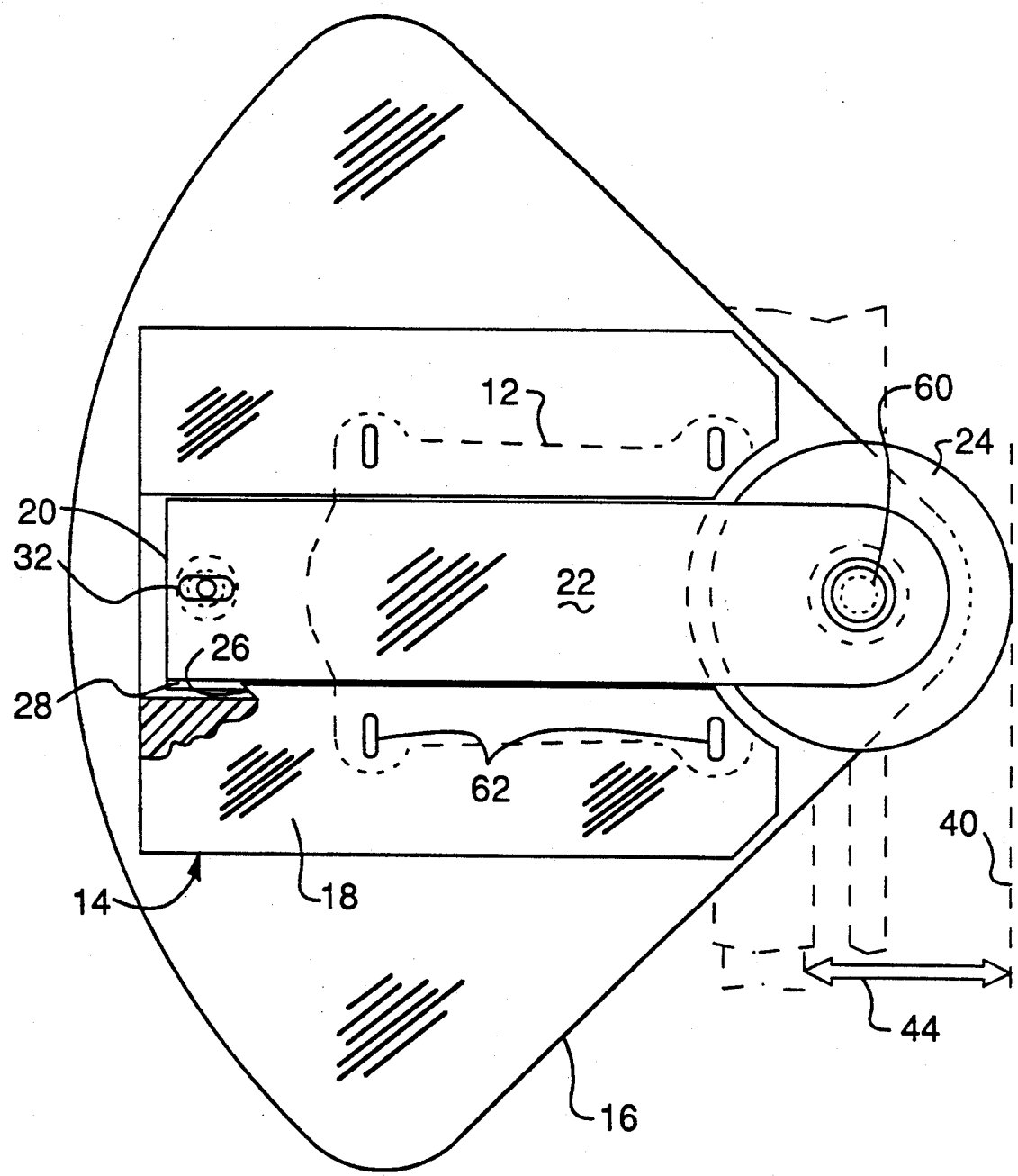
FIG. 2 is a top plan view showing the scribing accessory of the present invention disposed immediately above a conventional base plate.
Figure 3:
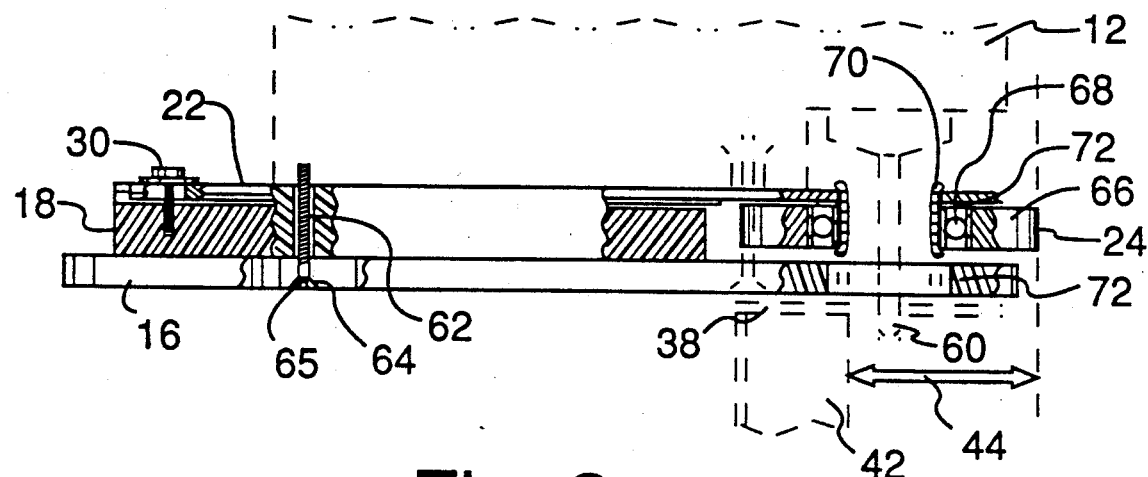
FIG. 3 is an elevational view of the embodiment shown in FIG. 2 partially broken away to illustrate various details thereof.

Turning now to FIGS. 2 and 3 of the drawing, which are respectively a plan view and side elevational view of block 14 and base plate 16, further details of the interrelationship between plate 22 and guide wheel 24 are illustrated as well as their relationship to drive mechanism 12 and router bit 60. Note that plate 22 is longitudinally adjustable in slot 20 by loosening screw 30. The need for such adjustment is to assure that wheel 24 is positioned concentric with bit 60. In order to accommodate minor lateral variations in bolt location, the apertures in block 18 through which securing screws extend are elongated in the transverse direction.

As is best illustrated in FIG. 3, guide wheel 24 is comprised of an outer "tire" 66 made of neoprene, nylon or other relatively rigid material and is disposed about a ball bearing assembly 68, the inner race of which is press-fit over a metal tube 70 which serves as the "axle" about which wheel 24 rotates and which journals wheel 24 to plate 22. A spacer ring of washer 72 is used to separate wheel 24 from plate 22 so that dust will not build up and prevent the wheel from turning freely. The ends of tube 70 are swaged or flared to lock the inner bearing race to plate 22. The inside diameter of tube 70 is chosen large enough to provide a passage through which the router bit 60 may be extended.

Note also that plate 16 is provided with an opening 72 through which bit 60 also extends. Plate 16 and spacer block 18 are also provided with passageways 64 and 62 respectively, through which attachment screws 65 may be extended to threadably engage the mating bores 34 in feet 36 (FIG. 1).

Figure 4:
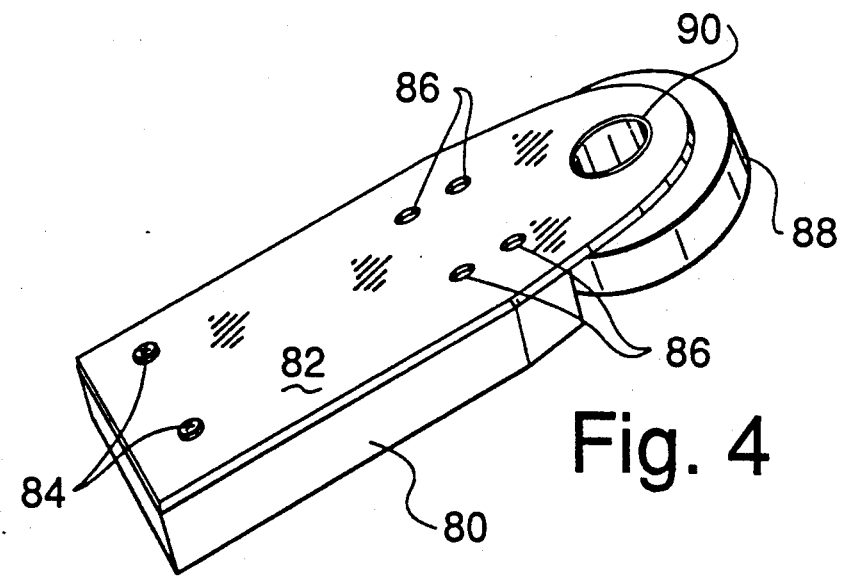
FIG. 4 is a perspective view illustrating an alternative embodiment of the present invention.

An alternative embodiment of the present invention suited for a different type of offset router than that depicted in FIGS. 1-3 is shown in FIG. 4. As in the previous embodiment, the device includes a spacer block 80 to which a metal plate 82 is attached by means of two screws 84. Cylindrical apertures 86 extend through plate 82 and block 80 to facilitate attachment to the bottom of an offset router mechanism. As in the first described embodiment, a guide wheel 88 is journaled to the plate 82 by means of a tubular shaft or axle 90 which provides a passageway through which the router bit may be extended.

In either of the two above-described embodiments the wheel carrying plate and spacer block can take any suitable configuration adequate to allow attachment to a particular type of router and to allow a base plate to be affixed to the bottom thereof. Alternatively, it will be appreciated that the spacer block 80 need not be separate from the base plate and can be formed as an integral part thereof. Moreover, the outer perimeter of the base plate 16 may have any suitable configuration. The essential point of novelty of the present invention is believed to be the provision of a scribing accessory including a wheel disposed concentric with an offset router bit to facilitate the scribing of laminates and other materials so that they may be configured to mate with matching surfaces.

Although the present invention has been described above in terms of two preferred embodiments, it is understood that additional alterations and modifications will no doubt become apparent to those skilled in the art after having read the above description. For example, other materials, features and parts shapes can be used. It is therefore intended that the appended claims be interpreted as covering all such alterations and modification as fall within the true spirit and scope of the invention.

What is claimed is:

1. A scribing accessory for offset type routers comprising:
   wheel means for maintaining a router bit at a predetermined fixed distance from a wall or other surface the contour of which is to be matched;
   spacer means for attachment to the router mechanism and for separating the lower extremity thereof from a work engaging surface a distance sufficient to accommodate the axial thickness of said wheel means; and
   journal means for rotatably connecting said wheel means to said spacer means and for providing a cylindrical passageway concentric with the outer perimeter of said wheel means through which the router bit may be extended.

2. A scribing accessory as recited in claim 1 wherein said spacer means includes a block of material and a plate attached to said block of material, the thickness of said block determining at least in part the spacing between said work engaging surface and the lower extremity of said router mechanism, and said plate serving as a means to which said wheel means is journaled.

3. A scribing accessory as recited in claim 1 wherein the lower surface of said spacer means forms a smooth base for engaging a flat surface of the material to be trimmed.

4. A scribing accessory as recited in claim 1 wherein said spacer means is adapted to have a base plate attached to the lower surface thereof.

5. A scribing accessory as recited in claim 2 wherein said plate is in the form of an elongated strip and said block has a channel formed in one surface thereof for receiving said strip, said strip being adjustably secured to said block so as to permit accurate alignment of the axis of rotation of said wheel means with the axis of rotation of said router bit.

6. A scribing accessory as recited in claim 3 wherein said plate is in the form of an elongated strip and said block has a channel formed in one surface thereof for receiving said strip, said strip being adjustably secured to said block so as to permit accurate alignment of the axis of rotation of said wheel means with the axis of rotation of said router bit.

7. A scribing accessory as recited in claim 4 wherein said plate is in the form of an elongated strip and said block has a channel formed in one surface thereof for receiving said strip, said strip being adjustably secured to said block so as to permit accurate alignment of the axis of rotation of said wheel means with the axis of rotation of said router bit.

8. A scribing accessory as recited in claim 2 wherein the lower surface of said spacer means forms a smooth base for engaging a flat surface of the material to be trimmed.

9. A scribing accessory as recited in claim 2 wherein said spacer means is adapted to have a base plate attached to the lower surface thereof.

10. A scribing accessory as recited in claim 1 and further comprising adjustable attachment means for allowing the alignment of said wheel means relative to said router bit to be adjusted.

* * * * *